United States Patent
Kubota et al.

[11] Patent Number: 5,936,761
[45] Date of Patent: Aug. 10, 1999

[54] WAVELENGTH CONVERSION APPARATUS

[75] Inventors: Shigeo Kubota, Kanagawa; Hisashi Masuda; Werner Wiechmann, both of Tokyo, all of Japan

[73] Assignee: Sony Corporation, Tokyo, Japan

[21] Appl. No.: 08/863,433

[22] Filed: May 27, 1997

[30] Foreign Application Priority Data

May 28, 1996 [JP] Japan .................................. 8-133669

[51] Int. Cl.$^6$ ........................................................ G02F 1/37
[52] U.S. Cl. ............................................. 359/328; 372/22
[58] Field of Search .................................. 359/326–332; 385/122; 372/21, 22

[56] References Cited

U.S. PATENT DOCUMENTS

4,068,190  1/1978  Ferguson ................... 372/22 X
5,541,765  7/1996  Tanuma ...................... 359/328

Primary Examiner—John D. Lee
Attorney, Agent, or Firm—Hill & Simpson

[57] ABSTRACT

A wavelength conversion device in which the fundamental wave is converged in a non-linear optical crystal for effecting wavelength conversion, and in which no significant peak is generated in the non-linear optical crystal even if the power of the input fundamental wave is high. The spot radius at the converging point of the fundamental wave is selected to be 0.0014 to 0.0023 cm, while the crystal length of the non-linear optical crystal is selected to be 0.5 to 1.2 cm. If this range is met, the light intensity distribution in the non-linear optical crystal becomes of the top hat type, such that no peak is generated.

18 Claims, 8 Drawing Sheets

WAVELENGTH CONVERSION APPARATUS

BACKGROUND OF THE INVENTION

1. Field of the Invention

This invention relates to a wavelength conversion device employing a non-linear optical crystal, such as β-barium borate crystal. More particularly, it relates to a wavelength conversion device used advantageously in, for example, a semiconductor light exposure device that requires uniform light intensity distribution.

2. Description of the Related Art

In a wavelength conversion device for wavelength conversion by generating second harmonics, the fundamental wave is converged in a non-linear optical crystal in order to effect wavelength conversion by a non-linear optical process in the non-linear optical crystal.

Heretofore, if, in a wavelength conversion device, the input fundamental wave has a Gaussian intensity distribution, and the non-linear optical crystal has a pre-set walk-off, the optimum convergence condition for wavelength conversion has been found by an equation by Boyd and Kleinman, 'Journal of Applied Physics', band 10, page 3597, 1968.

However, the Boyd and Kleinman's equation neglects attenuation of the fundamental wave in the non-linear process, that is depletion. Thus, if the depletion of the input fundamental wave is not negligible, specifically, if the power of the input fundamental wave is high, approximation is deteriorated significantly.

Meanwhile, if the fundamental wave of a power for which depletion is not negligible is input to a non-linear optical crystal, the intensity distribution of the waveform-converted light is distorted significantly, by the synergistic effect of depletion and walk-off, thus occasionally leading to significant peaks in the light intensity in the non-linear optical crystal.

Such peaks in the light intensity directly give rise to non-linear absorption and to light damage to the non-linear optical crystal. Moreover, if there is significant distortion in light intensity distribution in the non-linear optical crystal, the conversion efficiency is undesirably lowered when the second harmonics is used as a light source for the wavelength conversion of the next stage. Thus, in a wavelength conversion device, it has been desired to eliminate distortion in light intensity distribution in the non-linear optical crystal and any significant peaks in the light intensity.

However, since the Boyd and Kleinman's equation used for designing the wavelength conversion device does not take account of depletion, it has previously not been possible to analyze the phenomenon derived from the synergistic effect of the depletion and the walk-off.

SUMMARY OF THE INVENTION

It is therefore an object of the present invention to provide a wavelength conversion device in which the effect of depletion is taken into account and in which, even if the power of the input fundamental wave is high, distortion in light intensity of the wavelength-converted light is suppressed to eliminate any significant peak in the non-linear optical crystal.

For accomplishing the above object, the present inventors have taken the effect of depletion of the fundamental wave into the process of introducing the Boyd and Kleinman's equation and have calculated the intensity distribution of light in the non-linear optical crystal. The present invertors have found that, by properly setting the crystal length, for example, of the non-linear optical crystal, on the basis of the results of the computer simulation, it is possible to eliminate significant peaks in the intensity distribution of light in the non-linear optical crystal without impairing the efficiency in wavelength conversion.

According to the present invention, there is provided a wavelength conversion device for effecting wavelength conversion by having the fundamental wave converged in a non-linear optical crystal, wherein a spot radius at a converging point of the fundamental wave is 0.0014 to 0.0023 cm and the crystal length of the non-linear optical crystal is 0.5 to 1.2 cm.

With the crystal length of the non-linear optical crystal of 1, a walk-off angle of β and the wave vector of the fundamental wave of k, the relation of $0.5\rho(lk)^{1/2}>10$ preferably holds. Also, with the crystal length of the non-linear optical crystal of 1, the spot radius at the converging point of the fundamental wave of wx and the wave vector of the fundamental wave of k, the relation of $1<l/(kwx^2)<1.7$ preferably holds.

In the above waveform conversion device, second harmonics of a Q switch solid laser are used as the fundamental wave. In this case, the Q switch solid laser having an average output of the Q switch solid laser of 5 to 20 W, the repetition frequency of 1 to 10 kHz and the half-value total pulse width of 20 to 50 ns. As the Q switch solid laser, such a laser injection-locked using a solid laser for controlling the wavelength width of the output laser light is preferably used.

In the above waveform conversion device, the non-linear optical crystal is a β-barium borate crystal, as an example, and second harmonics are generated by the wavelength conversion. Specifically, the ultraviolet light, for example, is generated as the second harmonics.

In the above waveform conversion device, since the crystal length of the non-linear optical crystal is set taking the effect of depletion into account, the light intensity distribution is prohibited from becoming distorted even with a high power of the input fundamental wave, such that there is no risk of an acute peak being generated in the non-linear optical crystal.

According to the present invention, there is also provided a wavelength conversion device for effecting wavelength conversion by having the fundamental wave converged in a non-linear optical crystal, including a variable focal length zoom lens between a light source of the fundamental wave and the non-linear optical crystal. The spot radius of the fundamental wave is preferably changed by the zoom lens responsive to the power of the fundamental wave.

Preferably, with the crystal length of the non-linear optical crystal of 1, a walk-off angle of ρ and the wave vector of the fundamental wave of k, the relation of $0.5\rho(lk)^{1/2}>10$ holds. Also, with the crystal length of the non-linear optical crystal of 1, the spot radius at the converging point of the fundamental wave of wx and the wave vector of k, the relation of $1<l/(kwx^2)<1.7$ holds.

In the above waveform conversion device, the second harmonics of a Q switch solid laser, for example, are used as the fundamental wave. Preferably, the Q switch solid laser having an average output of 5 to 20 W, the repetition frequency of 1 to 10 kHz and the half-value total pulse width of 20 to 50 ns is used. As the Q switch solid laser, one injection-locked using a solid laser for controlling the wavelength width of the output laser light is preferably used.

In the above waveform conversion device, the non-linear optical crystal is a β-barium borate crystal, as an example.

By the waveform conversion, second harmonics, for example, are generated. Specifically, the ultraviolet light, for example, is generated as the second harmonics.

In the above waveform conversion device, since the crystal length of the non-linear optical crystal is set taking the effect of depletion into account, the light intensity distribution is prohibited from becoming distorted by changing the spot radius of the input fundamental wave even with a high power of the input fundamental wave, such that there is no risk of generation of an acute peak in the non-linear optical crystal.

According to the present invention, the optimum converging conditions for flattening out the light intensity distribution in the non-linear optical crystal are found taking the effect of depletion into account simultaneously. Thus, in the wavelength conversion device according to the present invention, only little distortion in the light intensity distribution in the non-linear optical crystal is produced, while there is no risk of generation of an acute peak in the light intensity in the non-linear optical crystal. That is, the present invention provides a wavelength conversion device in which the light intensity distribution in the non-linear liquid crystal is of the top hat type.

Also, in the wavelength conversion device according to the present invention, there is no risk of generation of an acute peak in light intensity distribution in the non-linear liquid crystal even if the fundamental wave used is of a large power for which the effect of depletion is not negligible. Thus, the present invention provides a wavelength conversion device of high output and high reliability in which only little self-heating or light damage of the non-linear liquid crystal ascribable to local linear absorption and non-linear absorption is produced.

DESCRIPTION OF THE PREFERRED EMBODIMENTS

Referring to the drawings, preferred embodiments of the present invention will be explained in detail. The present invention is not limited to the embodiment illustrated since it may be optionally modified without departing from the scope of the invention.

The present invention can be applied most effectively to waveform conversion carried out by inputting the fundamental wave having a high average power for which depletion cannot be disregarded to the non-linear optical crystal having high walk-off. In the instant embodiment, a β-barium borate crystal (BBO), which is a non-linear optical crystal having a higher walk-off, is used as a non-linear optical crystal, and the green laser light having a wavelength of 532 nm and a high average power, for which the effect of depletion cannot be disregarded, is used as the fundamental wave inputted to the β-barium borate crystal. At this time, the ultra-violet light having the wavelength of 266 nm is generated as second harmonics by wavelength conversion by the non-linear optical process.

As the green laser light, second harmonics of a Q-switch Nd: YAG laser was used. The Q-switch Nd: YAG laser outputting the laser light with the repetition frequency of 1 to 10 kHz, half-value total width of the pulse of 35 ns and an average output of 6 W has been put on sale. For controlling the wavelength width of the output laser light, the Q-switch Nd: YAG laser is injection-locked using a solid laser. The second harmonics are generated using a lithium borate crystal (LBO) as a non-linear crystal with the laser light from the Q-switch Nd:YAG laser as the fundamental wave.

With the green laser light, thus obtained, having the average power of not less than 3 W, a pulse waveform with the repetition frequency of 7 kHz and a half-value total width of 25 ns, has been observed, with the peak power reaching 17 kW. It has been empirically ascertained that, if the green laser having such a high output is converged in the β-barium borate crystal for generating second harmonics, a significant effect of depletion may be observed. The generation of second harmonics is hereinafter explained, in which the green laser light having the average power of not less than 3 W is used as the fundamental wave.

Meanwhile, a Q-switch Nd: YAG laser having an average output of the order of 10 W has been developed experimentally. Thus, the outlook is that the green laser light of the order of 6 W will be produced by generating second harmonics using the laser light from the Q-switch Nd: YAG laser as the fundamental wave. Thus the following explanation is directed to the results of computer simulation for a range of the average input power of the fundamental wave up to 6 W as an instance for which the effect of depletion cannot be disregarded.

The reason the range of the average input power is limited to 6 W is that a Q-switch solid laser having the high repetition frequency and the average power exceeding 10 W has not so far been developed such that the green light having the average input power exceeding 6 W is not currently available. However, such range of the average input power is not limiting the present invention. That is, if the fundamental wave having the average power exceeding 6 W can be inputted to the non-linear optical crystal, the present invention can naturally be applied to the range of the average input power of the fundamental wave exceeding 6 W.

Figure 1:
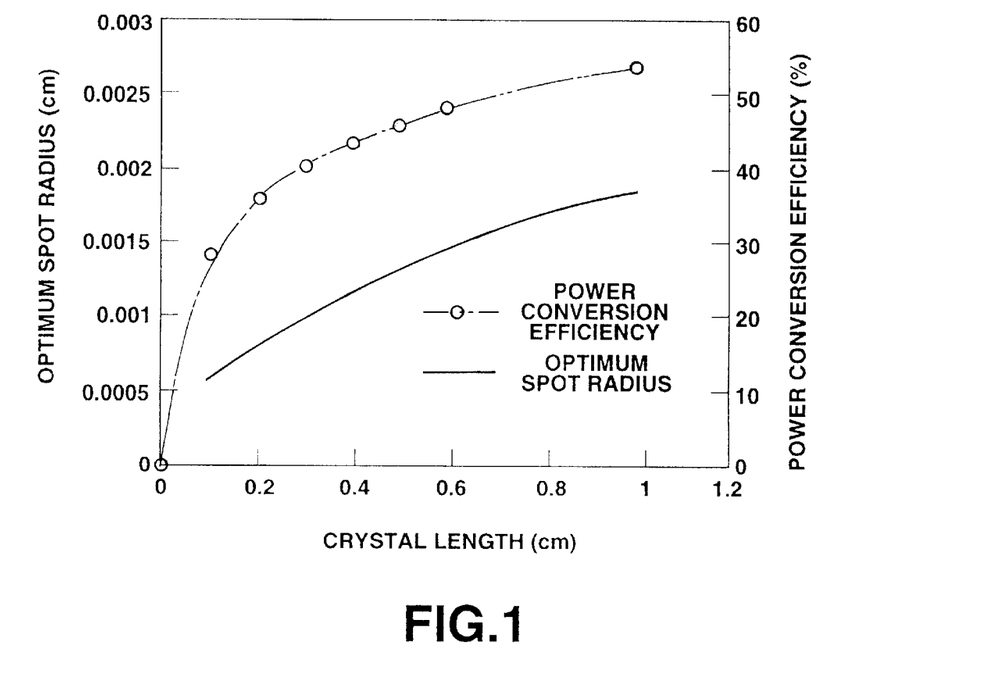
FIG. 1 is a graph showing crystal length dependency of the optimum spot radius and crystal length dependency of the power conversion efficiency for the average input power of the fundamental wave of 3 W.

Referring to FIG. 1, the relation between the power conversion efficiency and the crystal length of the β-barium borate crystal in case the second harmonics are generated using the β-barium borate crystal is hereinafter explained.

FIG. 1 shows the optimum spot radius in association with the crystal length of the β-barium borate crystal in case the green laser light having the average power of 3 W is entered to the β-barium borate crystal for generating the second harmonics. The optimum spot radius is the value of the spot radius in the walk-off direction at a converging point of the fundamental wave for the maximum power conversion efficiency in the generation of the second harmonics. FIG. 1 also shows the power conversion efficiency in the generation of second harmonics in case the spot radius at the converging point of the fundamental wave is the optimum spot radius.

As may be seen from FIG. 1, the power conversion efficiency basically is increased with increased crystal length, although it tends to be saturated due to the effect of depletion. Stated differently, the power conversion efficiency is decreased with decreased crystal length. Therefore, from the viewpoint of the power conversion efficiency, there is a lower limit to the usable crystal length. On the other hand, from the viewpoint of walk-off, there is an upper limit to the usable crystal length since the generated amount of walk-off is proportionate to the crystal length. Thus, there are upper and lower limits to the crystal length in view of the power conversion efficiency and the walk-off. Specifically, the range of the crystal length from 0.5 to 1.2 cm is optimum.

With this in mind, an instance of using a β-barium borate crystal with a crystal length of 0.6 cm and an instance of using a β-barium borate crystal with a crystal length of 1.0 cm is explained. The optimum spot radius is 0.00145 cm and 0.00185 cm if a β-barium borate crystal with a crystal length of 0.6 cm or one with a crystal length of 1.0 cm is used, respectively.

The walk-off parameter B, specifying the magnitude of the walk-off amount, is given by the equation:

$$B = 0.5\rho(lk)^{1/2} \quad (1)$$

where $l$ is the crystal length of a non-linear optical crystal, $\rho$ is the walk-off angle and $k$ is the wave vector of the fundamental wave.

If a β-barium borate crystal is used as a non-linear optical crystal and the green laser light with a wavelength of 532 nm is used as a fundamental wave, the walk-off angle $\rho$ is 84.3 $10^{-3}$ rad, while the wave vector $k$ of the fundamental wave is 1.98 $10^5$. Therefore, with the crystal length of 0.6 cm and 1.0 cm, the walk-off parameter B is 14.5 and 18.8, respectively. That is, the crystal length of 0.6 cm or 1.0 cm represents a condition for large walk-off with the walk-off parameter B exceeding 10.

By way of Example 1, an instance of converging the fundamental wave of a green laser light beam having a wavelength of 532 nm is converged in a β-barium borate crystal with a crystal length of 0.6 cm for generating the ultraviolet light with a wavelength of 266 nm as the second harmonics, is hereinafter explained.

As for the spot radius at a converging point of the fundamental wave, the radius in the walk-off direction is set to 0.00175 cm, while that in a direction perpendicular thereto is set to 0.004 cm.

Figure 2:
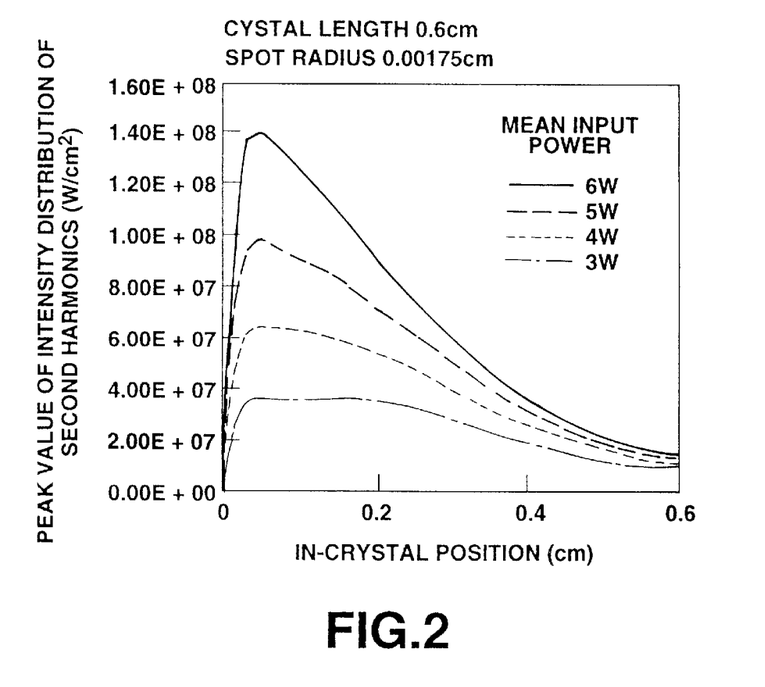
FIG. 2 is a graph showing the relation between the peak value of intensity distribution of the second harmonics and the position in the crystal for the crystal length of 0.6 cm and the spot radius of 0.00175 cm.

FIG. 2 shows the intensity distribution of the second harmonics on the optical axis of the basic wave with the average input power of the fundamental wave of 3 W, 4 W, 5 W or 6 W. In FIG. 2, the abscissa denotes the position in the β-barium borate crystal on the optical axis of the fundamental wave, while the ordinate denotes the peak value of the intensity distribution of the ultraviolet light generated as the second harmonics. Meanwhile, the intensity distribution of the ultraviolet light at the crystal end can be approximated by projecting the intensity distribution of the second harmonics shown in FIG. 2 towards the crystal end in the walk-off direction.

As may be appreciated from FIG. 2, the intensity distribution of the second harmonics becomes closest to flatness for the average input power of the fundamental wave of 3 W, with sharp peaks appearing with increased average input power of the fundamental wave.

Figure 3:
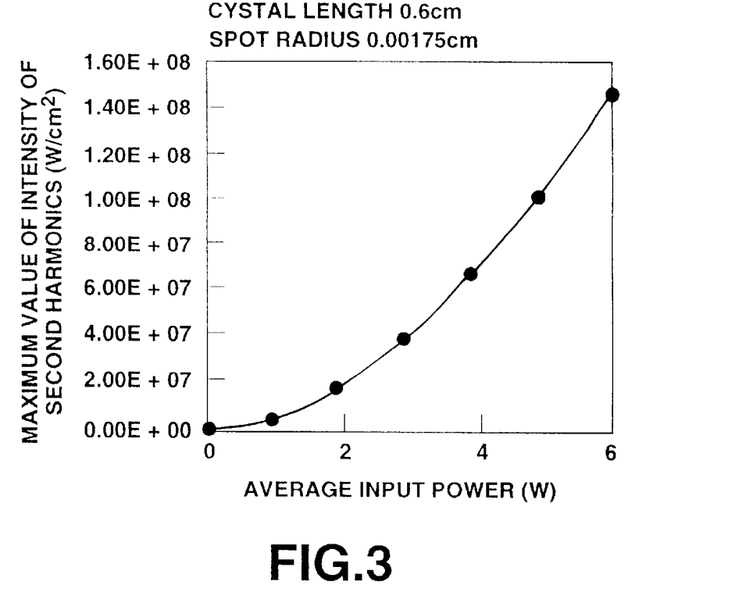
FIG. 3 is a graph showing the relation between the maximum value of the intensity of the second harmonics and the average input power of the fundamental wave for the crystal length of 0.6 cm and the spot radius of 0.00175 cm.

The intensity of the second harmonics becomes maximum in the vicinity of the crystal end without dependency on the power of the input fundamental wave. The maximum value of the intensity is increased as a quadratic function of the average input power of the fundamental wave, as shown in FIG. 3. For example, for the average input power of the fundamental wave of 6 W, the maximum value of the intensity of the second harmonics reaches 140 MW/cm². Since the two-photon absorption coefficient of the β-barium borate crystal at the wavelength of 266 nm is 0.9 GW/cm, the two-photon absorption by the β-barium borate crystal is 12.6% cm$^{-1}$. Thus, in the vicinity of the crystal end, absorption of the second harmonics rises to a non-negligible level. On the other hand, the intensity of the second harmonics in the vicinity of the rear crystal end is substantially at a constant level without dependency on the average input power of the fundamental wave.

Thus, in the example of FIG. 2, the intensity distribution of the ultraviolet light generated as the second harmonics is distorted significantly with increased power of the fundamental wave. If the intensity distribution of the ultraviolet light generated as the second harmonics is distorted such that an acute peak is generated in the intensity distribution, self-heating by two-photon absorption is locally induced thus giving rise to phase misregistration or light damage.

Meanwhile, the intensity distribution of the second harmonics becomes maximum in the vicinity of the crystal end, without dependency on the power of the fundamental wave, as described above. The position $Z_{max}$ in the crystal corresponding to the maximum intensity distribution of the second harmonics may be represented approximately by the equation (2):

$$Z_{max}=2wx/\rho \quad (2)$$

where $\rho$ is the walk-off angle of the β-barium borate crystal and wx is the radius in the walk-off direction of the spot at the converging point of the fundamental wave.

Since $\rho=84.3 \ 10^{-3}$ rad in the β-barium borate crystal, $Z_{max}=0.04$ cm for wx=0.00175 cm. This position is sufficiently close to the crystal input end with respect to the crystal length of 0.6 cm.

The walk-off parameter B is hereinafter explained.

With the wave vector of the fundamental wave of k and with the spot radius of wx, the confocal parameter b is defined by the following equation (3):

$$b=kwx^2 \quad (3)$$

Using this confocal parameter b, the focusing parameter ξ is defined by the following equation (4):

$$\xi=1/b=1/(kwx^2) \quad (4)$$

The equation of definition of the walk-off parameter B in the above equation (1) is represented as shown in the equation (5):

$$B=0.5\rho(lk)^{1/2}=0.5\rho(1/wx)\xi^{-\frac{1}{2}} \quad (5)$$

From the above equations (2) and (5), the position in the crystal, for which the intensity distribution of the second harmonics becomes maximum, is given by the equation (6):

$$Z_{max}=2wx/\rho=1\xi^{-\frac{1}{2}}/B \quad (6)$$

If the power conversion efficiency is maximum, the focusing parameter ξ is approximately 1, as will be explained subsequently. However, by setting the walk-off parameter B so that B>10, $Z_{max}$ is on the order of one-tenth of the crystal length.

As described above, if the power of the fundamental wave is sufficiently large and the walk-off parameter B>10, by tradeoff between the walk-off angle ρ and the crystal length 1 of the non-linear optical crystal, that is if $0.5\rho \ (lk)^{1/2}>10$, the position $Z_{max}$ in the crystal for which the intensity distribution of the second haronics is maximum is the vicinity of the input end of the crystal.

Meanwhile, the converging point of the fundamental wave entering the non-linear optical crystal is set so as to be in the vicinity of the center of the optical crystal. Therefore, the spot size at the input end of the crystal is typically two and a half times as large as that at the converging point. Thus, if the walk-off is small, the second harmonics is significantly increased in intensity in the vicinity of the center of the non-linear optical crystal to render it difficult to flatten out the intensity distribution of the second harmonics. If the walk-off is larger, as described above, the position $Z_{max}$ for which the intensity distribution of the second harmonics is maximum is the vicinity of the input end of the crystal, so that the intensity distribution of the second harmonics can be flattened out more easily.

Figure 4:
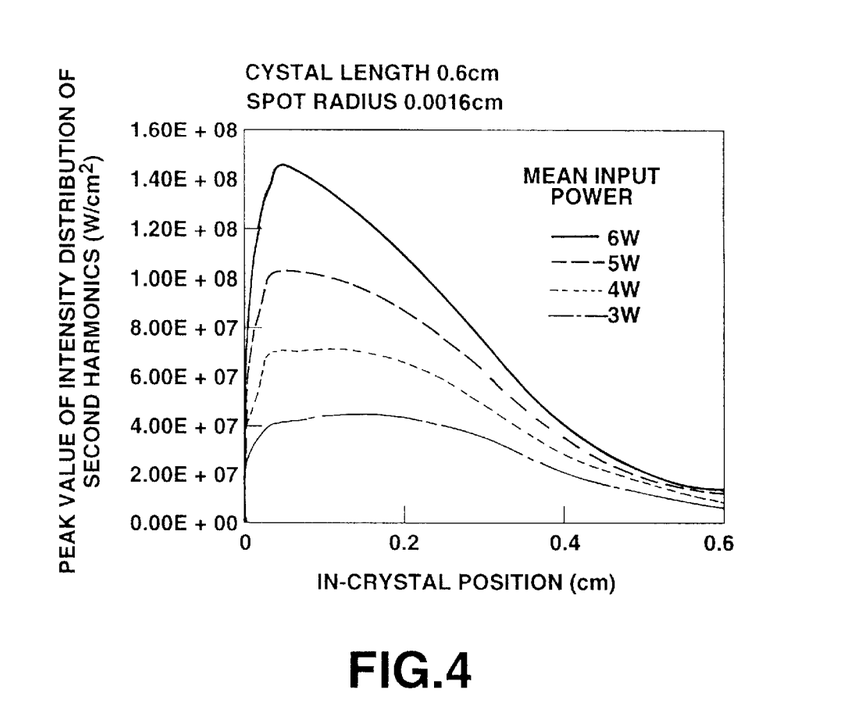
FIG. 4 is a graph showing the relation between the peak value of intensity distribution of the second harmonics and the position in the crystal for the crystal length of 0.6 cm and the spot radius of 0.0016 cm.

FIG. 4 shows the intensity distribution of the second harmonics on the optical axis of the fundamental wave as found for the spot radius in the walk-off direction at the converging point of the fundamental wave set to 0.0016 cm, with other conditions being the same as those shown in FIG. 2. The convergence of the fundamental wave is made slightly stronger than in the case of FIG. 2, as a result of which the average input power of the fundamental wave is closest to flatness for the average input power of the fundamental wave of 4 W.

Figure 5:
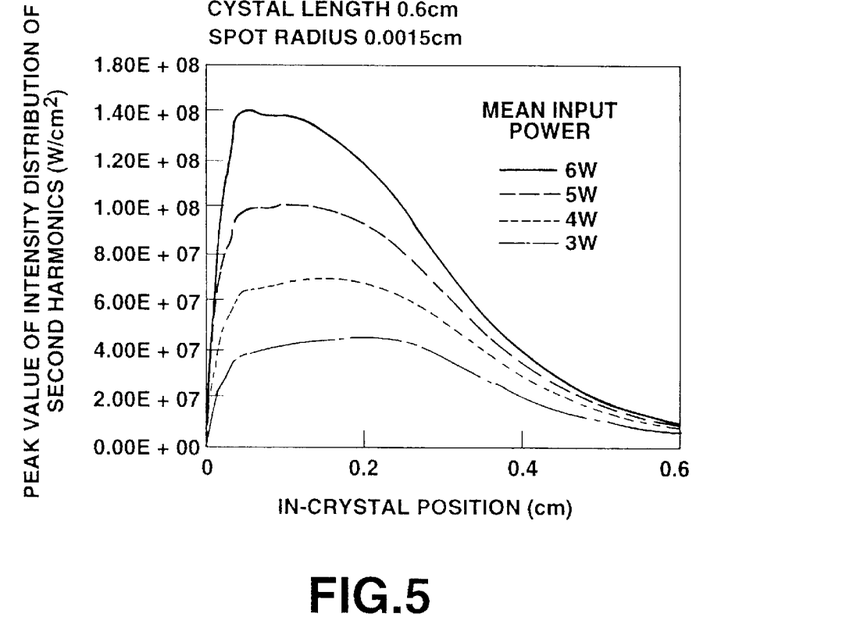
FIG. 5 is a graph showing the relation between the peak value of intensity distribution of the second harmonics and the position in the crystal for the crystal length of 0.6 cm and the spot radius of 0.0015 cm.

FIG. 5 shows the intensity distribution of the second harmonics on the optical axis of the fundamental wave as found for the spot radius in the walk-off direction at the converging point of the fundamental wave set to 0.0015 cm, with other conditions being the same as those shown in FIG. 2. The convergence of the fundamental wave is made slightly stronger than in the case of FIG. 2, as a result of which the average input power of the fundamental wave is closest to flatness for the average input power of the fundamental wave of 5 W.

Figure 6:
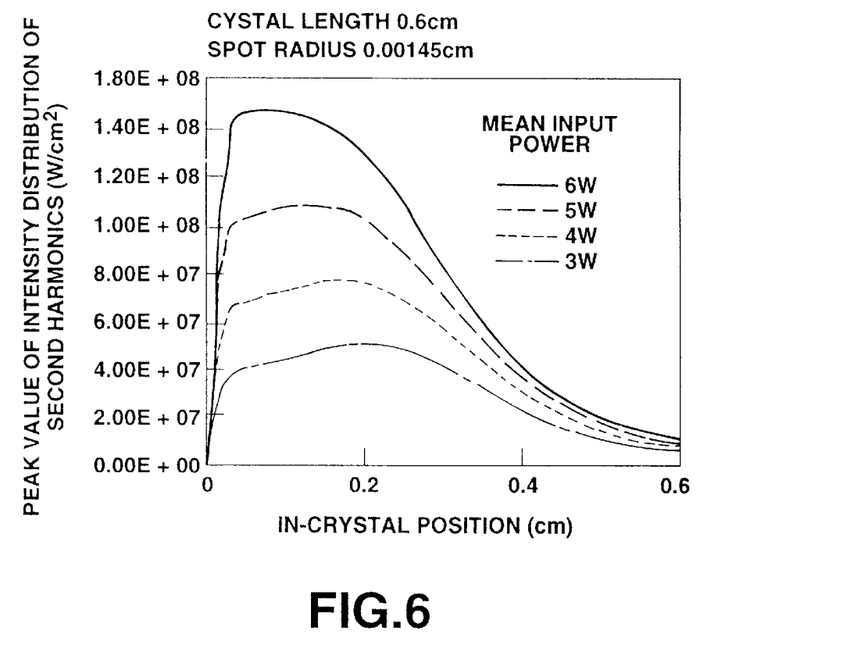
FIG. 6 is a graph showing the relation between the peak value of intensity distribution of the second harmonics and the position in the crystal for the crystal length of 0.6 cm and the spot radius of 0.00145 cm.

FIG. 6 shows the intensity distribution of the second harmonics on the optical axis of the fundamental wave as found for the spot radius in the walk-off direction at the converging point of the fundamental wave set to 0.0014 cm, with other conditions being the same as those shown in FIG. 2. The convergence of the fundamental wave is made slightly stronger than in the case of FIG. 5, as a result of which the average input power of the fundamental wave is closest to flatness for the average input power of the fundamental wave of 6 W.

If the results of FIGS. 2 and 4 to 6 are summarized, it is desirable to have the fundamental wave converged to a smaller spot, responsive to the increased power of the fundamental wave, if it is desired to flatten out the intensity distribution of the second harmonics.

In general, if the power of the fundamental wave is increased, depletion of the fundamental wave in the vicinity of the input end of the non-linear optical crystal becomes stronger, so that the intensity distribution of the generated ultraviolet light tends to be increased in distortion. However, if the fundamental wave is converged to a smaller spot, the spot size in the vicinity of the input end of the non-linear optical crystal becomes relatively larger due to the effect of diffraction, thus enabling the above tendency of the distortion of the intensity distribution to be canceled. Thus, by having the fundamental wave converged to a smaller spot responsive to the increased power of the fundamental wave, it becomes possible to flatten out the intensity distribution of the second harmonics.

As a second embodiment, the instance of converging the fundamental wave comprised of the green laser light with the wavelength of 532 nm in a β-barium borate crystal with a crystal length of 1.0 cm for generating the ultraviolet light with the wavelength of 266 nm as the second harmonics is explained.

As for the spot radius at a converging point of the fundamental wave, the radius in the walk-off direction is set to 0.0021 cm, while that n a direction perpendicular thereto is set to 0.004 cm.

Figure 7:
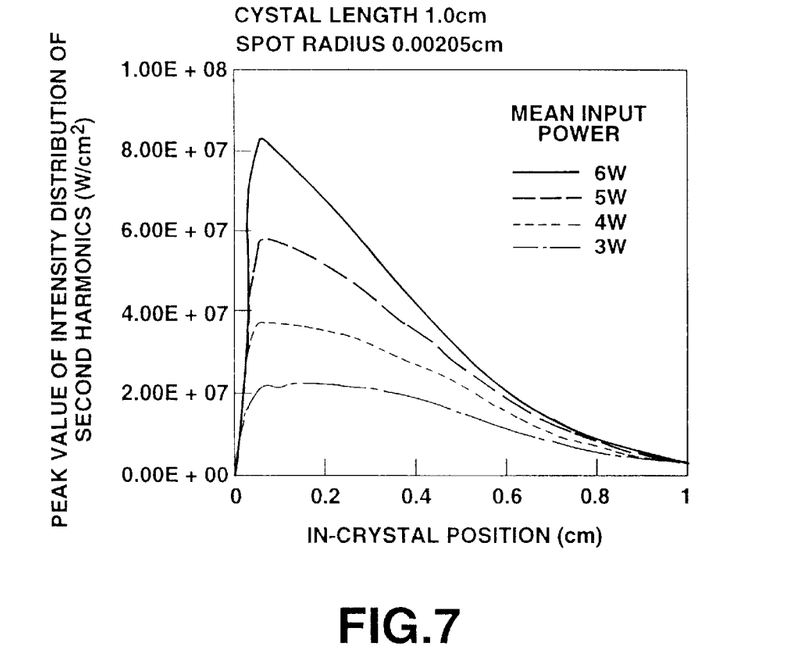
FIG. 7 is a graph showing the relation between the peak value of intensity distribution of the second harmonics and the position in the crystal for the crystal length of 1.0 cm and the spot radius of 0.00205 cm.

FIG. 7 shows the intensity distribution of the second harmonics on the optical axis of the basic wave with the average input power of the fundamental wave of 3 W, 4 W, 5 W or 6 W. In FIG. 7, the abscissa denotes the position in the β-barium borate crystal on the optical axis of the fundamental wave, while the ordinate denotes the peak value of the intensity distribution of the ultraviolet light generated as the second harmonics. In this case, the intensity distribution is closest to flatness for the average input power of the fundamental wave of 3 W.

Figure 8:
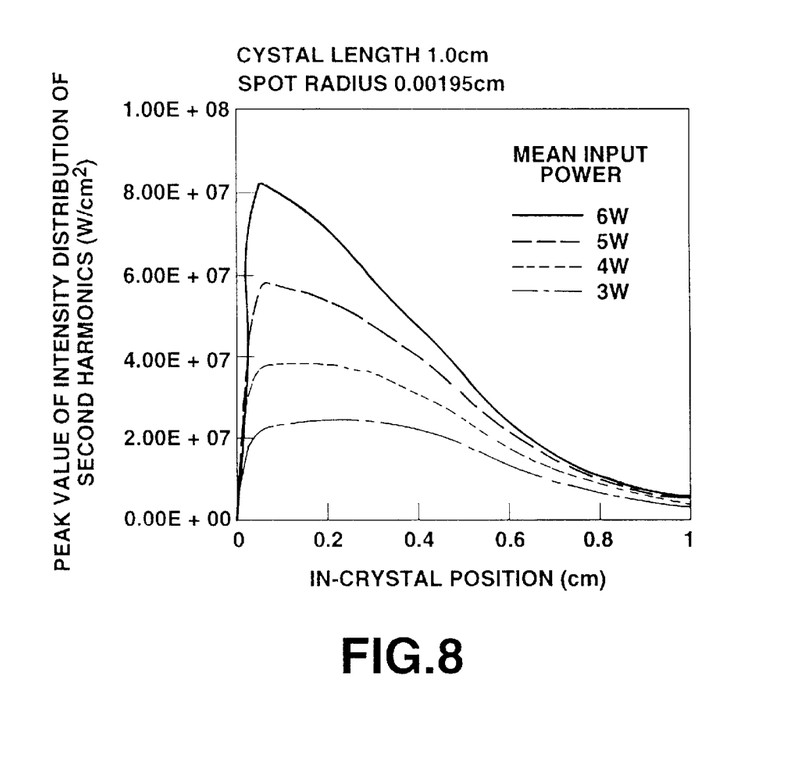
FIG. 8 is a graph showing the relation between the peak value of intensity distribution of the second harmonics and the position in the crystal for the crystal length of 1.0 cm and the spot radius of 0.00195 cm.

FIG. 8 shows the intensity distribution of the second harmonics on the optical axis of the fundamental wave as found for the spot radius in the walk-off direction at the converging point of the fundamental wave set to 0.00195 cm, with other conditions being the same as those shown in FIG. 7. The convergence of the fundamental wave is made slightly stronger than in the case of FIG. 7, as a result of which the average input power of the fundamental wave is closest to flatness for the average input power of the fundamental wave of 3 W.

Figure 9:
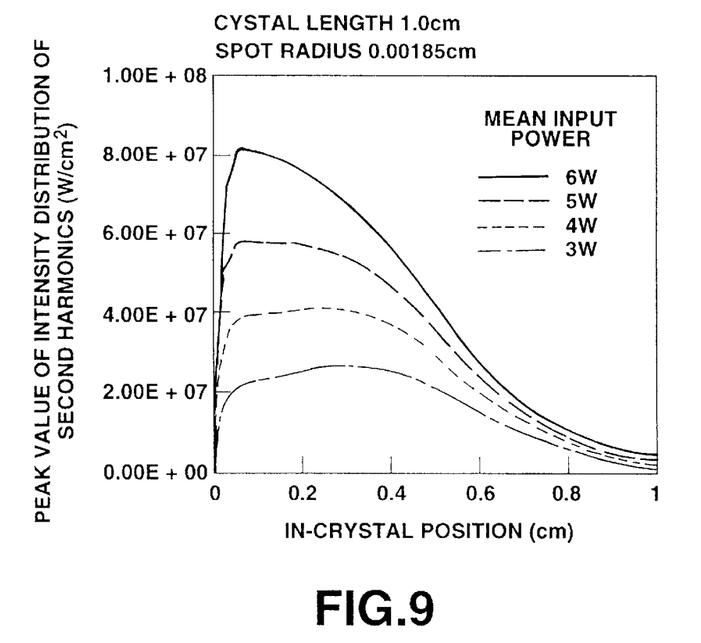
FIG. 9 is a graph showing the relation between the peak value of intensity distribution of the second harmonics and the position in the crystal for the crystal length of 1.0 cm and the spot radius of 0.00185 cm.

FIG. 9 shows the intensity distribution of the second harmonics on the optical axis of the fundamental wave as found for the spot radius in the walk-off direction at the converging point of the fundamental wave set to 0.00185 cm, with other conditions being the same as those shown in FIG. 7. The convergence of the fundamental wave is made slightly stronger than in the case of FIG. 8, as a result of which the average input power of the fundamental wave is closest to flatness for the average input power of the fundamental wave of 5 W.

Figure 10:
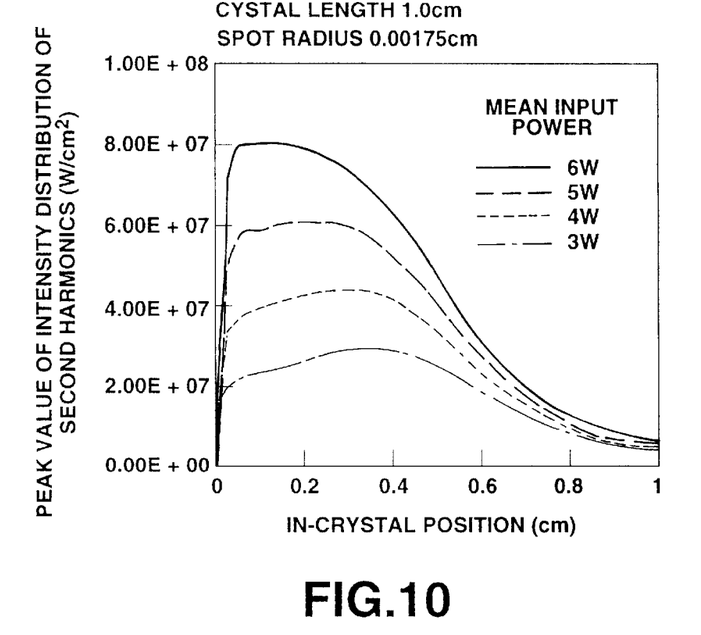
FIG. 10 is a graph showing the relation between the peak value of intensity distribution of the second harmonics and the position in the crystal for the crystal length of 1.0 cm and the spot radius of 0.00175 cm.

FIG. 10 shows the intensity distribution of the second harmonics on the optical axis of the fundamental wave as found for the spot radius in the walk-off direction at the converging point of the fundamental wave set to 0.00175 cm, with other conditions being the same as those shown in FIG. 7. The convergence of the fundamental wave is made slightly stronger than in the case of FIG. 9, as a result of which the average input power of the fundamental wave is closest to flatness for the average input power of the fundamental wave of 6 W.

On the basis of the above results of Examples 1 and 2, the manner of how the spot radius at the converging point of the fundamental wave is set for flattening out the intensity distribution of the second harmonics is explained.

Figure 11:
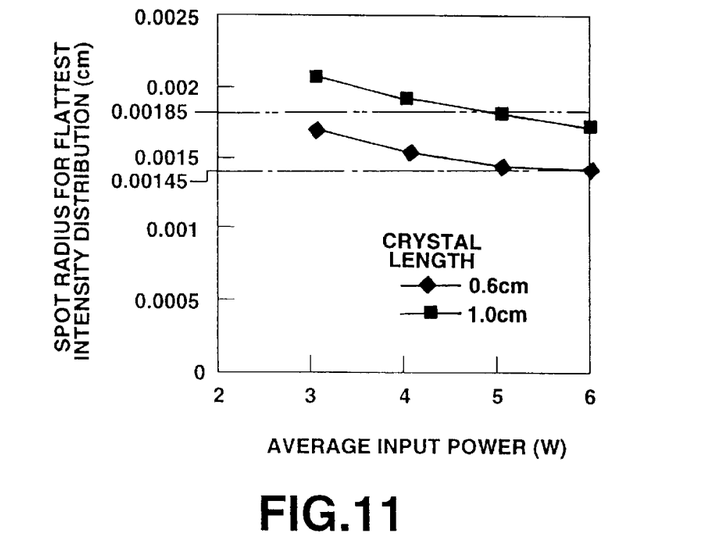
FIG. 11 is a graph showing the relation between the spot radius and the average input power of the fundamental wave for the flattest intensity distribution of the second harmonics.

FIG. 11 shows the spot radius which flattens out the intensity distribution of the second harmonics for average input power values of the fundamental wave of 3 to 6 W with the crystal length of 0.6 mm or 1.0 mm.

As may be seen from FIG. 11, the spot radius optimum for flattening tends to be reduced with the increased average input power of the fundamental wave no matter whether the crystal length is 0.6 mm or 1.0 mm.

The optimum spot radius which maximizes the power conversion efficiency for the crystal length of 0.6 cm is 0.00145 cm, irrespective of the average input power of the fundamental wave, as described above. This spot radius value coincides with the spot radius for which the intensity distribution of the second harmonics is flattened out most significantly for the average at input power of the fundamental wave of 6 W, as shown in FIG. 11. On the other hand, the optimum spot radius which maximizes the power conversion efficiency for the crystal length of 1.0 cm is 0.00185 cm, irrespective of the average input power of the fundamental wave, as described above. This spot radius value coincides with the spot radius for which the intensity distribution of the second harmonics is flattened out most significantly for the average input power of the fundamental wave 5 W, as shown in FIG. 11.

It will be apparent from the above results that, by properly setting the spot radius at the converging point of the fundamental wave, specifically, by selecting the spot radius to be in a range from 0.0014 to 0.0023 cm, the intensity distribution of the second harmonics can be flattened out even if the input fundamental wave is of a high power such that the effect of depletion in the β-barium borate crystal cannot be disregarded.

For changing the spot radius at the converging point of the fundamental wave, it suffices to arrange a variable focal length type zoom lens between the light source 1 of the fundamental wave and the β-barium borate crystal 2.

Figure 12:
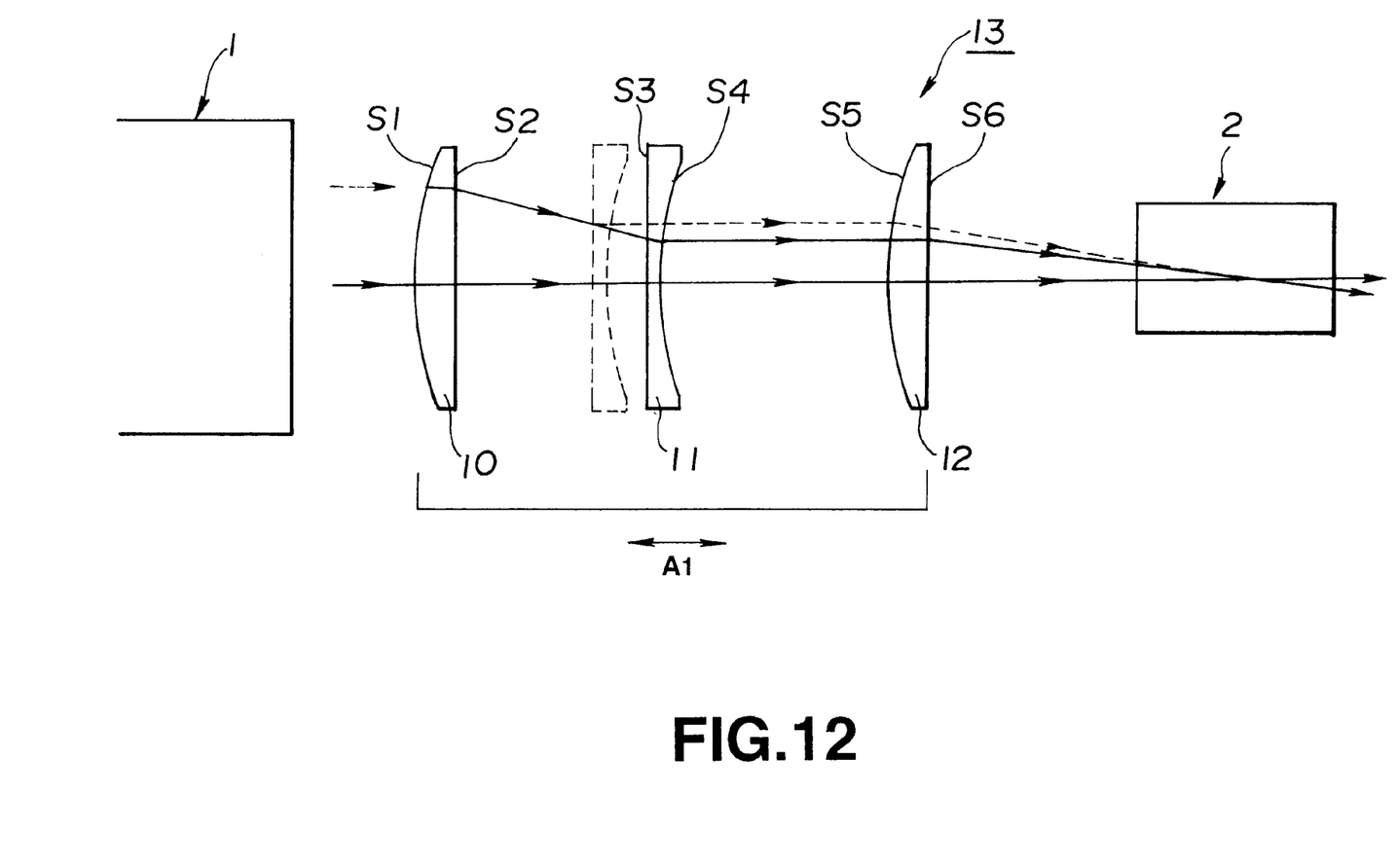
FIG. 12 shows an example of a zoom lens for varying the spot radius.

For example, if the upper limit and the lower limit of the spot radius are 0.0018 cm and 0.0014 cm, respectively, the ratio of the upper limit to the lower limit of the spot radius is 1.3. Thus it suffices to arrange a telephoto lens, with a multiplication factor of 1.3, before a single convex lens, as a main lens for converging the fundamental wave, for constituting a zoom lens as a whole, as shown for example in FIG. 12. The telephoto lens is a combination of a pair of single convex lenses 10, 12 and a single concave lens 11, as shown in FIG. 12. By moving the single convex lenses 10 and 12 as a unitary set relative to the fixed single concave lens 11 in the fore-and-aft direction along the optical axis as shown by arrow A1 in FIG. 12, the spot size of the fundamental wave incident on the β-barium borate crystal can be changed continuously. Specified examples of the lens data for such zoom lens are shown in Table 1.

TABLE 1

| surface number | radius of curvature (mm) | surface distance on axis (mm) | glass type |
|---|---|---|---|
| object surface | infinite | | air |
| S1 | 32.2 | 2.4 | synthetic quartz |
| S2 | infinite | 7.908360 to 2.90836 | air |
| S3 | infinite | 2.0 | synthetic quartz |
| S4 | 11.5 | 7.189780 to 12.18978 | air |
| S5 | 13.8 | 2.9 | synthetic quartz |
| S6 | infinite | 71.697492 to 66.69254 (back focusing quantity) | |
| image surface | infinite | −0.05356 to −0.11441 (defocusing quantity) | |

Zoom ratio, 1.3; focal length, 74.8877 to 57.8166 mm; rms wavefront aberration on axis, 0.001 to 0.002 λ.

By arranging a variable focal length zoom lens between the light source of the fundamental wave and the β-barium borate crystal, and by changing the spot radius of the fundamental wave by the zoom lens responsive to, for example, the power of the fundamental wave, it becomes possible to optimize the intensity distribution of the second harmonics.

The focusing parameter ξ which flattens out the intensity distribution of the second harmonics most significantly is explained. This focusing parameter is referred to hereinafter as an optimum focusing parameter.

Figure 13:
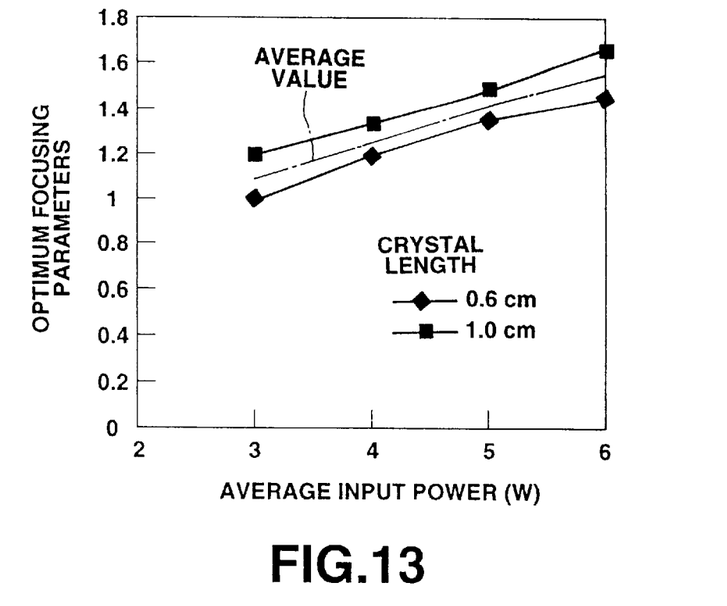
FIG. 13 is a graph showing the relation between the optimum focusing parameter and the average input power of the fundamental wave.

FIG. 13 shows the optimum focusing parameter plotted for each of the average input power values of the fundamental wave of 3 to 6 W, on the basis of Examples 1 and 2, with the crystal length of 0.6 mm or 1.0 mm.

It is seen from FIG. 13 that the optimum focusing parameter for the crystal length of 0.6 cm is perpetually smaller than the optimum focusing parameter for the crystal length of 1.0 cm. However, the optimum focusing parameter for the crystal length of 0.6 cm and the optimum focusing parameter for the crystal length of 1.0 cm are both within the range of ±10% from the average value of the optimum focusing parameter.

The average value of the optimum focusing parameter can be approximated by the following equation (7):

$$\xi = 0.7 + 0.14P \quad (7)$$

where P is the average input power of the fundamental wave (W).

As may be seen from FIG. 13, the optimum focusing parameter for the crystal length of 0.6 mm or 1.0 mm is within the range of the following inequality (8):

$$1 < \xi < 1.7 \quad (8)$$

Stated differently, the intensity distribution of the second harmonics can be optimized by changing the focusing parameter $\xi$ represented by $1/(wx^2)$ within the range of the above inequality (8).

The relation between the spot radius of the fundamental wave and the power conversion efficiency of the generation of second harmonics is now explained.

Figure 14:
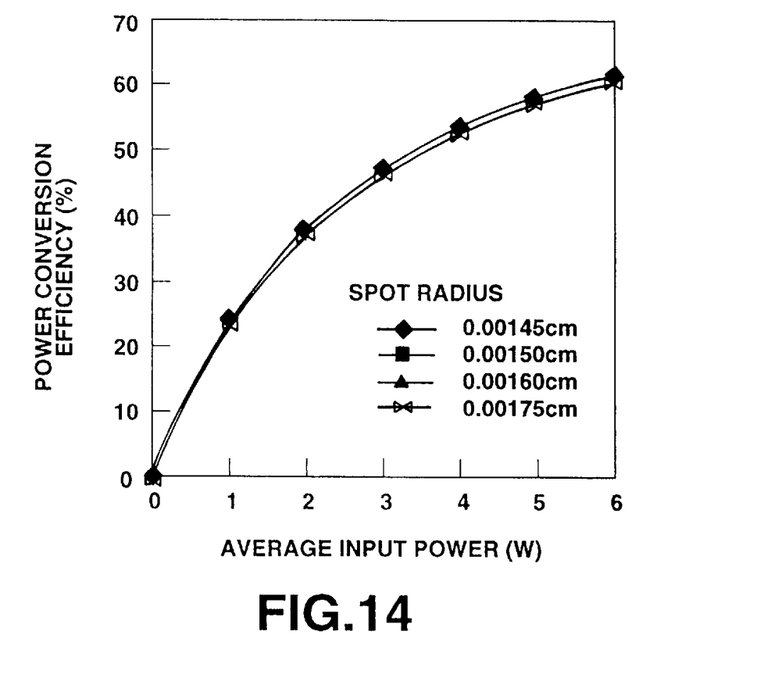
FIG. 14 is a graph showing the relation between the power conversion efficiency in generation of second harmonics and the average input power of the fundamental wave.

FIG. 14 shows the relation between the power conversion efficiency of the generation of second harmonics and the average input power of the fundamental wave. Specifically, FIG. 14 shows the relation between the power conversion efficiency and the average input power for the instance of Example 1 with the crystal length of 0.6 mm, with the spot radius of the fundamental wave as the parameter.

Referring to FIG. 14, for an area with the average input power of the fundamental wave of not less than 1 W, the power conversion efficiency ascribable to depletion is seen to be saturated, whereas, in the range of the spot radius of Example 1, changes in the power conversion efficiency with the spot radius are substantially negligible. Therefore, the power conversion efficiency is not impaired even if the spot radius is changed for flattening out the intensity distribution of the second harmonics.

Figure 15:
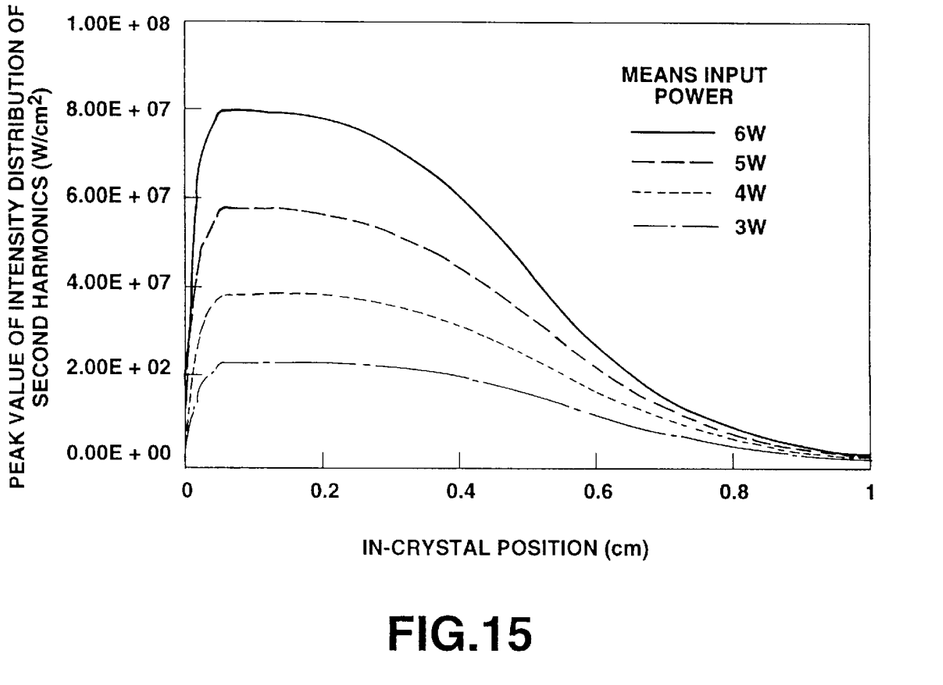
FIG. 15 is a graph showing the relation between the peak value of the intensity distribution of the second harmonics and the position within the crystal when the spot radius is optimized responsive to changes in the average input power of the fundamental wave.

FIG. 15 shows the intensity distribution of the second harmonics in case the spot radius is optimized responsive to the average input power of the fundamental wave. Specifically, FIG. 15 shows the peak value of the intensity distribution of the second harmonics when the spot radius is optimized responsive to the average input power of the fundamental wave for Example 2 with the crystal length of 1.0 mm. By optimizing the crystal length, power of the fundamental wave and the spot radius in this manner, the intensity distribution of the second harmonics becomes flat without exhibiting significant peaks, thus becoming of the so-called top-hat type.

In the above description, the green laser light is used as the fundamental wave, and ultraviolet light is generated as its second harmonics. However, the present invention is not limited to this specified embodiment and may be broadly applied to a wavelength conversion device employing a linear optical crystal adapted for converting the wavelength of the input fundamental wave by converging the fundamental wave in the linear optical crystal.

Although the β-barium borate crystal is taken as an example of the non-linear optical crystal, this specified crystal is merely given as an example of the non-linear optical crystal. That is, such non-linear optical crystal capable of wavelength-converting the input fundamental wave by the non-linear optical process can be used broadly as the non-linear optical crystal used in the wavelength conversion device of the present invention.

What is claimed is:

1. A wavelength conversion device for effecting wavelength conversion by having a fundamental wave converged in a non-linear optical crystal, characterized in that
   a spot radius at a converging point in the fundamental wave is from 0.0014 to 0.0023 cm and a crystal length of said non-linear optical crystal is from 0.5 to 1.2 cm.

2. The wavelength conversion device as claimed in claim 1 characterized in that
   with the crystal length of said non-linear optical crystal of 1, a walk-off angle of ρ and the wave vector of the fundamental wave of k, the relation:

$$0.5\rho(lk)^{1/2} > 10$$

holds.

3. The wavelength conversion device as claimed in claim 1 characterized in that
   with the crystal length of said non-linear optical crystal of 1, the spot radius at a converging point of said fundamental wave of wx and a wave vector of the fundamental wave of k, the relation:

$$1 < l/(kwx^2) < 1.7 \text{ holds.}$$

4. The wavelength conversion device as claimed in claim 1 characterized in that
   second harmonics of a Q switch solid laser are used as said fundamental wave.

5. The wavelength conversion device as claimed in claim 4 characterized in that
   an average output of said Q switch solid laser is 5 to 20 W, the repetition frequency is 1 to 10 kHz and the half-value total pulse width is 20 to 50 ns.

6. The wavelength conversion device as claimed in claim 4 characterized in that
   said Q switch solid laser is injection-locked using a solid laser for controlling the wavelength width of the output laser light.

7. The wavelength conversion device as claimed in claim 1 characterized in that
   said non-linear optical crystal is a β-barium borate crystal.

8. The wavelength conversion device as claimed in claim 1 characterized in that
   second harmonics are generated by said wavelength conversion.

9. The wavelength conversion device as claimed in claim 8 characterized in that
   ultraviolet light is generated as said second harmonics.

10. A wavelength conversion device for effecting wavelength conversion by having a fundamental wave converged in a non-linear optical crystal, comprising:
    a variable focal length zoom lens between a light source of said fundamental wave and said non-linear optical crystal;
    the spot radius of the fundamental wave being changed by said zoom lens responsive to the power of said fundamental wave.

11. The wavelength conversion device as claimed in claim 10 characterized in that
    with the crystal length of said non-linear optical crystal of 1, a walk-off angle of ρ and the wave vector of the fundamental wave of k, the relation:

$$0.5\rho(lk)^{1/2} > 10$$

holds.

12. The wavelength conversion device as claimed in claim 10 characterized in that
    with the crystal length of said non-linear optical crystal of 1, the spot radius at the converging point of said fundamental wave of wx and the wave vector of k, the relation:

$1 < l/(kwx^2) < 1.7$ holds.

13. The wavelength conversion device as claimed in claim 10 characterized in that second harmonics of a Q switch solid laser are used as said fundamental wave.

14. The wavelength conversion device as claimed in claim 13 characterized in that an average output of said Q switch solid laser is 5 to 20 W, the repetition frequency is 1 to 10 kHz and the half-value total pulse width is 20 to 50 ns.

15. The wavelength conversion device as claimed in claim 13 characterized in that said Q switch solid laser is injection-locked using a solid laser for controlling the wavelength width of the output laser light.

16. The wavelength conversion device as claimed in claim 10 characterized in that said non-linear optical crystal is a β-barium borate crystal.

17. The wavelength conversion device as claimed in claim 10 characterized in that second harmonics are generated by way of waveform conversion.

18. The wavelength conversion device as claimed in claim 17, characterized in that ultra-violet light is generated as said second harmonics.

* * * * *